United States Patent [19]
Gozdz et al.

[11] Patent Number: 5,429,891
[45] Date of Patent: Jul. 4, 1995

[54] CROSSLINKED HYBRID ELECTROLYTE FILM AND METHODS OF MAKING AND USING THE SAME

[75] Inventors: Antoni S. Gozdz, Tinton Falls; Caroline N. Schmutz, Eatontown; Jean-Marie Tarascon, Martinsville; Paul C. Warren, Far Hills, all of N.J.

[73] Assignee: Bell Communications Research, Inc., Livingston, N.J.

[21] Appl. No.: 243,018

[22] Filed: May 13, 1994

Related U.S. Application Data

[63] Continuation-in-part of Ser. No. 110,262, Aug. 23, 1993, which is a continuation-in-part of Ser. No. 26,904, Mar. 5, 1993, Pat. No. 5,296,318.

[51] Int. Cl.$^6$ .................. H01M 6/16; H01M 4/66
[52] U.S. Cl. .................. 429/192; 429/191; 429/194; 429/245; 429/247; 429/249; 429/253; 429/254
[58] Field of Search .............. 429/192, 191, 194, 245, 429/247, 254, 249, 253, 218

[56] References Cited

U.S. PATENT DOCUMENTS

| | | | |
|---|---|---|---|
| 4,468,441 | 8/1984 | D'Agostino et al. | 429/254 |
| 4,699,857 | 10/1987 | Giovannoni et al. | 429/254 |
| 4,731,310 | 3/1988 | Anderman et al. | 429/194 |
| 4,735,875 | 4/1988 | Anderman et al. | 429/194 |
| 4,849,144 | 7/1989 | McLoughlin | 429/249 |

OTHER PUBLICATIONS

Feuillade, G., Ion-Conductive macromolecular gels and membranes for solid lithium cells, Journal of Appl. Electrochem. 5(1975) 63-69.

*Primary Examiner*—John Niebling
*Assistant Examiner*—Bruce F. Bell
*Attorney, Agent, or Firm*—Leonard Charles Suchyta; Lionel N. White

[57] ABSTRACT

A polymeric film useful as an interelectrode separator or electrolyte member in electrolytic devices, such as rechargeable batteries, comprises a copolymer of vinylidene fluoride and hexafluoropropylene, a medium to high-boiling plasticizer, and a finely divided inorganic filler which has been subjected to actinic radiation or thermal energy to cause crosslinking thereof in the presence of a crosslinking agent selected from the group consisting of an acrylate ester, di- or triallyl ester and a di- or triglycidyl ether.

20 Claims, 3 Drawing Sheets

CROSSLINKED HYBRID ELECTROLYTE FILM AND METHODS OF MAKING AND USING THE SAME

RELATED APPLICATIONS

This application is a continuation-in-part of U.S. patent application Ser. No. 08/110,262 filed Aug. 23, 1993, which is a Continuation-in-part of Ser. No. 08/026,904 filed Mar. 5, 1993, now U.S. Pat. No. 5,296,318 issued Mar. 22, 1994, both of which are incorporated, in their entirety, by reference herein.

BACKGROUND

1. Field of the Invention

The invention relates to crosslinked electrolytic film compositions useful in the preparation of separator membranes and hybrid electrolytes for electrolytic cells. For example, such a film material may be used in a rechargeable battery cell as an intermediate separator element containing an electrolyte solution through which ions from a source electrode material move between cell electrodes during the charge/discharge cycles of the cell. The invention is particularly useful for cells in which the ion source is lithium, a lithium compound, or a material capable of intercalating lithium ions. In that system, the film material may comprise a polymeric matrix which is ionically conductive by virtue of, for example, the incorporation of a dissociable lithium salt solution which can provide ionic mobility. One advantage of the present invention is the limited flow capability of the crosslinked material at elevated temperature enhancing the cell capability and decreasing the tendency to short circuit at high temperature, yet preserving its high ionic conductivity.

2. Background of the Invention

Early rechargeable lithium cells utilized lithium metal electrodes as the initial ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of lithium salt, as well as providing a means for preventing destructive contact between the electrodes of the cell. Sheets or membranes ranging from glass fiber filter paper or cloth to microporous polyolefin film or nonwoven fabric have been saturated with solutions of a lithium salt, such as LiClO$_4$, LiPF$_6$ or LiBF$_4$, in an organic solvent, e.g., propylene carbonate, diethoxyethane, or dimethyl carbonate, to form such separator elements. The fluid electrolyte bridge thus established between the electrodes has effectively provided the necessary Li$^+$ ion mobility at conductivities in the range of about 10$^{-3}$ S/cm.

Although serving well in this role of ion conductor, these separator elements unfortunately comprise sufficiently large solution-containing voids so that continuous avenues may be established between the electrodes, thereby enabling lithium dendrite formation during charging cycles which eventually leads to internal cell short-circuiting. U.S. Pat. No. 5,196,279 achieved some success in combatting this problem through the use of lithium-ion cells in which both electrodes comprise intercalation material, such as lithiated manganese oxide and carbon, thereby eliminating the lithium metal which promotes the deleterious dendrite growth. While providing efficient power sources, these lithium-ion cells cannot attain the capacity provided by lithium metal electrodes.

Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which are enhanced in ionic conductivity by the incorporation of a salt, typically a lithium salt such as LiClO$_4$, LiPF$_6$ or the like. A range of practical ionic conductivity, i.e., over about 10$^{-5}$ or 10$^{-3}$ S/cm, was only attainable with these polymer composition at ambient conditions well above room temperature, however. U.S. Pat. No. 5,009,970 reported some improvement in mechanical properties while maintaining sufficient ionic conductivity of the more popular poly(ethylene oxide) composition by radiation induced cross-linking, while U.S. Pat. No. 5,041,346 reported improvement by meticulous blending with exotic ion solvating polymer compositions. Each of these attempts achieved limited success due to attendant expense, chemical instability and restricted implementation in commercial practice.

Some earlier examinations of poly(vinylidene fluoride) polymer and related fluorocarbon copolymers with trifluoroethylene or tetrafluoroethylene revealed enhancement of ionic conductivity by a simple incorporation of lithium salts and solvents compatible with both the polymer and the salt components. This work by Tsuchida et al. (Electrochimica Acta, Vol. 28 (1983), No. 5, pp. 591–595 and No. 6, pp. 833–837) indicated, however, that the preferred poly(vinylidene fluoride) compositions were capable of exhibiting ionic conductivity above about 10$^{-5}$ S/cm only at elevated temperatures reportedly due to the inability of the composition to remain homogeneous, i.e., free of deleterious salt and polymer crystallites, at or below room temperature. Such limitations apparently led to the abandonment of attempts to implement these compositions in practical rechargeable cells.

Prior work in U.S. Pat. No. 5,296,318 by the instant inventors developed a stable self-supporting film composition which is a copolymer of (poly)vinylidene fluoride with 8 to 25% by weight hexafluoropropylene (HFP). The material is self-limiting as below the 8% limit on HFP the crystallinity of (poly)vinylidene fluoride persists resulting in films incapable of sufficient uptake of the electrolyte solution, and above 25% HFP the formation of a self-supporting film may not be possible. These copolymers perform satisfactorily even after heating up to 70° C.; however, the plasticized copolymer is soluble in the liquid electrolyte at temperatures higher than 80°–95° C. Melting of the electrolyte film under constant stress may result in the flow of the electrolyte and an internal shorting of the battery with the resulting fast discharge and heating.

It is well known that while the majority of fluoropolymers which do not contain specific functional groups undergo degradation by scission, rather than crosslinking when exposed to ionizing radiation, PVdF is an exception to the rule. It has been found in U.S. Pat. No. 3,142,629 that irradiation of PVdF to a dose of 8–50 Mrad with 4.5 MeV electron beam increases its mechanical properties at elevated temperatures by crosslinking the polymer. This patent discloses that only compositions containing more than 85% by weight of PVdF are suitable for e-beam crosslinking.

Elastomeric copolymers of vinylidene fluoride and hexafluoropropylene which are known under the Viton® (DuPont), FLUOREL® (3M), Technoflon® (Montecatini Edison), and DAI-EI® (Daikin) tradenames are chemically crosslinkable only at high temperatures (160°–1900° C.) in the presence of the diamine- or bisphenol-type additives. These additives could not be tolerated in the Li-ion battery due to side reactions with the active hydrogen atoms (—NH and -Ph-OH groups). It was thus surprising that films composed of poly(-vinylidene fluoride) or its copolymer with hexafluoropropylene, crosslinked with dicinnamylidene hexanediamine (DIAK® curing agent, DuPont) in methyl ethyl ketone, and plasticized with a saturated solution of $NH_4ClO_4$ in propylene carbonate were found by G. Feuillade and Ph. Perche, *J. Appl. Electrochem.* 1975, 5, 63–69, to be suitable separators for Li/FeS cells. In these systems, MgO or $Ca(OH)_2$ are added to the fluoropolymer elastomer as an HF scavenger. These additives, however, may be deleterious to the performance of the Li-ion cell.

The present invention provides a means for avoiding the disadvantages of prior rechargeable lithium battery compositions and constructions by enabling the ready and economical preparation of strong, flexible polymeric electrolyte material which function over a range extending well above and below room temperature.

SUMMARY OF THE INVENTION

Further advantages of the invention will be set forth in part in the description which follows and in part will be apparent from the description, or may be learned by practice of the invention. The advantages of the invention may be realized and attained by means of the instrumentalities and combinations particularly pointed out in the appended claims.

To achieve the foregoing advantages and in according with the purpose of the invention, as embodied and broadly described herein, there is disclosed:

A copolymer of vinylidene fluoride and hexafluoropropylene which is crosslinked in the presence of a crosslinking agent selected from the group consisting of an acrylate ester, a di- or triallyl ester and a di- or triglycidyl ether and a plasticizer.

There is further disclosed:

A method of making a copolymer of poly(vinylidene fluoride) and hexafluoropropylene which includes polymerizing vinylidene fluoride and hexafluoropropylene to form a copolymer, treating the copolymer with a crosslinking agent selected from the group consisting of an acrylate ester, a di- or triallyl ester and a di-or triglycidyl ether, and subjecting the treated copolymer to actinic radiation to cause crosslinking of the copolymer in the presence of a plasticizer.

There is also disclosed:

A solid electrolyte for a rechargeable lithium intercalation battery cell which comprises a substantially self-supporting film of a copolymer of vinylidene fluoride and hexafluoropropylene which copolymer has been crosslinked in the presence of an extractable plasticizer and a crosslinking agent selected from the group consisting of an acrylate ester, a di- or triallyl ester and a di- or triglycidyl ether, and having distributed therein 20 to 70% by weight of a solution of at least one lithium salt in an organic solvent of said salt.

There is further disclosed:

A rechargeable lithium intercalation battery cell including a positive electrode, a negative electrode and an ionically conductive solid electrolyte disposed between the electrodes in which the electrolyte is characterized by a substantially self-supporting film of a copolymer of vinylidene fluoride and hexafluoropropylene which copolymer has been crosslinked in the presence of a crosslinking agent selected from the group consisting of an acrylate ester, a di- or triallyl ester and a di- or triglycidyl ether, and the film having distributed therein about 20% to about 70% by weight of a solution of at least one lithium salt in an organic solvent for the salt.

There is still further disclosed:

A separator membrane for an electrolytic cell characterized in that the membrane includes a substantially self-supporting film of a copolymer of vinylidene fluoride and hexafluoropropylene which has been crosslinked in the presence of a plasticizer and a crosslinking agent selected from the group consisting of an acrylate ester, a di- or triallyl ester and a di- or triglycidyl ether.

There is also disclosed:

A method of making a separator membrane material for an electrolytic cell including mixing a copolymer of vinylidene fluoride and hexafluoropropylene which has been crosslinked in the presence of a crosslinking agent selected from the group consisting of an acrylate ester, a di- or triallyl ester and a di- or triglycidyl ether with about 20% to about 70% by weight of a high-boiling plasticizer compatible with the copolymer and subjecting the mixture to actinic radiation to crosslink said copolymer and said crosslinking agent to form a self-supporting film.

There is still further disclosed:

A rechargeable battery cell assembly including a positive electrode, a negative electrode and a separator membrane disposed therebetween which membrane is characterized by a substantially self-supporting film of a copolymer of vinylidene fluoride and hexafluoropropylene which has been crosslinked in the presence of a plasticizer and a crosslinking agent selected from the group consisting of an acrylate ester, a di- or triallyl ester and a di- or triglycidyl ether.

The accompanying drawings, which are incorporated in and constitute a part of the specification, illustrate various aspects of the invention and, together with the description, serve to explain the principles of the invention.

DESCRIPTION OF THE INVENTION

Figure 1:
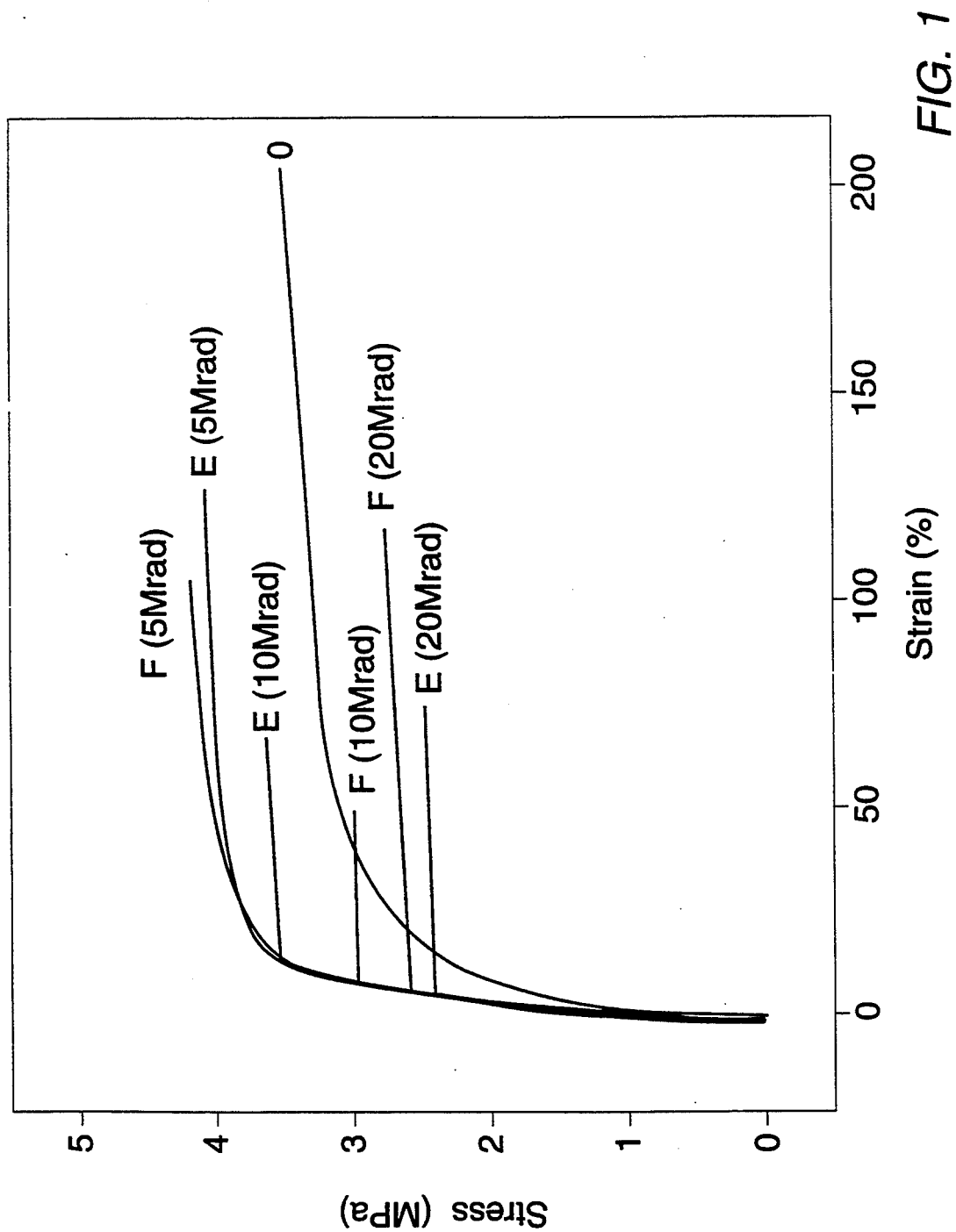
FIG. 1 illustrates the relationship between strain and stress at 25° C. for both uncrosslinked and crosslinked samples.

The electrolytic film of the present invention, which can be used in electrolytic cell separator elements and as component polymeric electrolytes, comprises the combination of a poly(vinylidene fluoride) copolymer matrix, an electrolytic salt, and a compatible solvent and a finely divided inorganic filler which maintains a homogeneous composition in the form of a flexible self-supporting film. The copolymer comprises vinylidene fluoride and hexafluoropropylene, which has been crosslinked in the presence of a plasticizer and a crosslinking agent selected from the group consisting of an acrylate ester, a di-or triallyl ester and a di- or triglycidyl ether.

The electrolytic film of the present invention is prepared from a vinylidene fluoride (VdF):hexafluoropropylene (HFP) copolymer which is combined with a polyfunctional crosslinking agent which itself crosslinks under actinic radiation. The copolymer is also combined with a plasticizer which is any extractable solvent or material which when added to the copolymer maintains sufficient memory to allow introduction of an electrolytic solution, and with proper sensitizers and/or free radical polymerization initiators. The crosslinking agent and the plasticizer can either be added to the copolymer simultaneously or successively.

The copolymer/crosslinking agent/plasticizer/filler/additive mixture is than treated with actinic radiation e.g., an electron beam, thermal energy or UV radiation to facilitate the crosslinking of the copolymer.

A number of commercially-available polyvinylidene fluoride (PVdF) polymers and copolymers were investigated for utilization in preparing the polymeric electrolyte/separator films of the present invention. Since the ready formation of self-supporting films or layers of polymeric electrolyte is of paramount importance in practical electrolytic cell construction, attempts were made to cast these solutions at reasonable ambient conditions, i.e., from dissolution with no more than moderate heating to formation of a sturdy dry layer without excessive processing, such as extended radiation or annealing. Organic casting solvents, such as acetone, tetrahydrofuran, methyl ethyl ketone, dimethyl carbonate, dimethoxyethane, mixtures of the above, and the like are suitable. Acetone is the preferred casting solvent. Acetone is a common casting solvent for the PVdF materials, as well as for the high boiling solvents, or plasticizers, to be incorporated, preferably simultaneously, on the basis of its desirable solvating and drying properties.

Vinylidene fluoride copolymer with hexafluoropropylene for use in the present invention can be obtained commercially from Atochem North America. The vinylidene fluoride copolymer preferably has a molecular weight which ranges from about $100 \times 10^3$ to about $500 \times 10^3$. More preferably, the copolymer has a molecular weight of from $200 \times 10^3$ to $400 \times 10^3$. Preferred copolymers are those having an intrinsic viscosity in acetone of 1.1–1.6 dL/g at 25° C.

A group of PVdF copolymers has been discovered which meets the requirements for successful polymeric electrolytic/separator membrane material particularly for use in lithium battery cells. The undesirable high crystallinity of the PVdF homopolymer may apparently be suppressed to an optimum degree by the copolymerization of vinylidene fluoride with about 8% or more hexafluoropropylene (HFP). Below the lower limit, the crystallinity of the primary monomer persists, resulting in unmanageable coating solutions, unsatisfactory film texture and strength, and limited high-boiling solvent retention. Above about 25% hexafluoropropylene, on the other hand, although the solutions remain fluid at ambient room temperature and below, removal of the major coating vehicle, e.g., acetone, fails to result in the formation of a self-supporting film.

In order to facilitate the formation of a three-dimensional network at practical energy levels, e.g., with electron beams (less than or equal to 20 Mrad at 4.5 MeV), and a network that would provide the required mechanical stability to a highly plasticized film above its melting/dissolution temperature, the addition of different polyfunctional compounds were compared. The results of these studies appear in Table 1 below and form one basis for the presently claimed invention.

Preferred crosslinking agents according to the present invention are selected from the group consisting of acrylate ester, a di- or triallyl ester and a di- or triglycidyl ether. More preferably, the crosslinking agents of the present invention are selected from trimethylolpropane trimethacrylate, trimethylolpropane triacrylate, glycerol triacrylate, and glycerol trimethacrylate.

Crosslinking is carried out in the presence of actinic radiation which may be, for example, electron beam, thermal energy, or ultra violet light. Crosslinking may preferably carried out with an electron beam of from about 100kV to about 10 MeV at a dose of 20 Mrad or less, in air. More preferably, the dose of the electron beam is at less than 10 Mrad, and most preferably, the electron beam is at between about 1 and about 10 Mrad. Thus, the copolymer of the present invention is crosslinked at temperatures in the range of 15° to 70° C., induced by self heating during irradiation in air. The copolymer of the invention is subjected to crosslinking without substantial HF scavengers that could interfere with subsequent electrolytic activity thereof.

In a preferred embodiment of the present invention, the copolymer comprises about 75% to 92% by weight vinylidene fluoride and about 8% to about 25% hexafluoropropylene, a range in which the latter comonomer limits the crystallinity of the final copolymer to a degree which ensures good film strength while enabling the retention of about 40 to about 60% of a solvent for the electrolyte salt. Within this range of solvent content, the 5% to 7.5% salt contained in a hybrid electrolyte membrane promotes an effective ionic conductivity of between about $10^{-5}$ and $10^{-2}$ S/cm, more preferably between about $10^{-4}$ and $3 \times 10^{-3}$ S/cm, yet the membrane exhibits no evidence of solvent exudation which might lead to cell leakage or loss of conductivity.

In a most preferred embodiment, the copolymer comprises 3 parts of vinylidene fluoride with 8 to 17% hexafluoropropylene, 5 parts of a plasticizer, 2 parts of a filler, a crosslinking agent as described above, and a casting solvent.

Electrolytic cells, such as rechargeable battery cells, may be constructed by means of in situ preparation of the electrode and electrolyte elements, utilizing coatable compositions comprising the copolymer materials of the present invention.

For example, batteries may be constructed by the separate formation of the electrode elements, by coating or otherwise, followed by assembly of the resulting electrodes with an intermediate separator membrane prepared according to the present invention. The crosslinker may be added to the copolymer and then crosslinked either prior to or subsequent to assembly. At this assembly stage, the separator membrane is substantially devoid of the hygroscopic electrolyte salt. Only during the final battery sealing operation when the electrolyte salt solution is introduced into the battery cell is there concern for maintaining anhydrous conditions, as may be effectively achieved in an atmosphere of dry, inert gas. Once in contact with the assembled separator body, the salt solution readily migrates throughout the membrane matrix to provide substantially the same conductivity enhancement as achieved by a preformed hybrid electrolyte film.

Preferred lithium electrolyte salts include LiPF6, LiAsF6, LiClO4, LiN(CF3SO2)2, LiBF4, LiCF3SO3 and LiSbF6. Preferred solvents include ethylene carbonate, propylene carbonate, dimethyl carbonate, diethoxyethane, diethyl carbonate, dimethoxyethane, dipropyl carbonate and mixtures thereof.

The present separator/electrolyte film is generally prepared from a composition comprising the vinylidene fluoride (VdF):hexafluoropropylene (HFP) copolymer and a compatible high-boiling plasticizer, and an inorganic filler. This plasticizer may be any of the various organic compounds commonly used as polymer plasticizers, or in the dual role as the solvents for the electrolyte salts, e.g., propylene carbonate, ethylene carbonate, proplyene carbonate and the like, as well as mixtures of these compounds. A particularly suitable group of such solvents are higher-boiling plasticizer compounds, such as dibutyl phthalate, ttributoxyethylphosphate and the like. The addition of inorganic fillers, such as alumina or silanized fumed silica, enhances the physical strength of a membrane, especially at elevated temperatures, substantially increases the subsequent level of electrolyte absorption.

Any common procedure for casting or forming films of polymer compositions may be employed in the preparation of the present membrane material. Where casting or coating of a fluid composition is used, e.g., by spin-coating or with meter bar or doctor blade apparatus, the viscosity of the composition will normally be reduced by the addition of a low-boiling casting solvent, such as acetone, tetrahydrofuran (THF), methyl ethyl ketone (MEK) or the like. Such coatings may be air-dried at ambient to moderate temperature to yield self-supporting films of a homogenous, plasticized copolymer. The membrane material may also be formed by obtaining the copolymer in commercially available form, i.e., pellet or powder, to swell in a proportionate amount of plasticizer solvent and crosslinker and then pressing the swollen mass between heated (e.g., about 130° C.) plates or rollers, or extruding the mixture.

The plasticized film material may be used in that form to fashion cell separator membranes, after layer fusion, it may be reduced to a "dry" film by extraction, or leaching, of the plasticizer solvent from the copolymer matrix with a polymer-inert extracting solvent, such as diethyl ether, hexanes, Freon 113, methanol and the like. Either form of the battery/laminate may be stored until assembled into a final electrolytic cell. A cell may be assembled by forming two opposite electrodes filled with plasticized membrane material as a binder/separator and extraction with solvent to obtain a "dry" cell.

Upon introduction of electrolyte salt solution into an assembled cell, a plasticized film membrane will imbibe the solution throughout the matrix, in effect displacing the plasticizer. A "dry" membrane, on the other hand, will readily absorb the electrolyte solution to substantially regain the extracted plasticizer. An advantage realized with this latter form of separator membrane material arises from the fact that all impurities present in the separator membrane including retained moisture and extractable residues from crosslinking, are removed.

A further advantage of the "dry" film embodiment of the invention over prior separator membrane materials is the lack of voids which were usually dispersed throughout a sheet or film, either naturally due to fiber interweaving or intentionally as a result of mechanical processing of some polyolefin film materials. Such voids not only lead to dangerous dendrite growth in cells such as rechargeable lithium batteries, but also prevent a natural absorption of electrolyte solution into assembled cell structures due to the air entrapped within the voids. This latter problem could previously only be alleviated by additional cell assembly operations requiring evacuation of the cell to remove air from the separator material and introduction of electrolyte under pressure prior to sealing the cell. A dry separator membrane of one embodiment of the present invention, i.e., one from which the initial plasticizer solvent has been leached, on the other hand, possesses no discernible voids, rather it appears to exhibit a solvent recovery "memory" which prompts the membrane to readily absorb an amount of electrolyte solution substantially equal to that of the initial plasticizer. In this manner, the desired ion conductivity range of up to about $3 \times 10^{-3}$ S/cm is readily achieved.

A further advantage of this embodiment of the invention over prior separator materials is the limited flow capability of the crosslinked material at elevated temperature enhancing the cell capability and decreasing the tendency to short circuit at high temperature, yet preserving its high ionic conductivity.

The following examples are not to be construed as limiting the invention as described herein.

EXAMPLES

Example 1

A composition was prepared composed of 3 parts of Kynar FLEX 2822, 2 parts of silanized fumed $SiO_2$, and 5 parts of DBP and 20 parts of acetone. A crosslinker was added at 5 wt. % based upon the level of DBP. The crosslinkers tested are listed below:

A) 1,4-butanediol digycidyl ether
B) triallyl 1,3,5-benzenetricarboxylate
C) 1,3,5-triallyl triazine-2,4,6-(1H,3H,5H)-trione
D) triglycidyl glycerol
E) trimethylolpropane triacrylate
F) trimethylolpropane trimethacrylate The copolymers with the crosslinkers added were cast from acetone into films which were 4 mils (0.1 mm thick) using a doctor-blade casting apparatus on a glass plate. The films were dried for 15 minutes in a stream of air and placed between 0,075 mm thick Mylar ® sheets to prevent liquid components from evaporating. The film samples were exposed to a 4.5 MeV electron beam from a Dynamitron ® machine to radiation doses of 5, 10, and 20 Mrads. A 2.5 Mrad dose per single pass was used to prevent an excessive heating of the samples.

The film samples were then tested to determine the effect of added crosslinker on film solubility. The film samples were immersed as small coupons (7×35 mm) in acetone with gentle shaking and stirring. The results are summarized in Table 1, below. Also reported in Table 1 is the solubility of both filled and unfilled samples of plasticized P(VdF-HFP) copolymers.

TABLE I

Solubility of DBP-plasticized(50 wt.-%)Kynar FLEX 2822 films in acetone after irradiation with a 4.5 MeV e-beam in the presence of various polyfunctional crosslinkers

| X-linker (3-2(SiO$_2$)-5 | X-linker conc. % vs. DBP | 2.5 | 5 | 10 | 20 |
|---|---|---|---|---|---|
| A | 5 | N/T | sol. | sol. | sol. |
| B | 5 | N/T | sol. | soft, insol. | soft, insol. |
| C | 5 | N/T | sol. | soft, insol. | soft, insol. |
| D | 5 | sol. | sol. | sol. | sol. |
| E | 1 | sol | soft, insol. | insol. | insol. |
| E | 3 | soft, insol. | insol. | insol. | insol. |
| E | 5 | N/T | insol. | insol. | insol. |
| E (no filler) | 5 | soft, insol. | soft, insol. | insol. | insol |
| F | 1 | sol | sol | soft, insol. | insol. |
| F | 3 | disintegr. | insol. | insol. | insol. |
| F | 5 | insol. | insol. | insol. | insol. |
| none (no filler) | 0 | sol | sol. | sol. | sol. |
| none (Al$_2$O$_3$) | 0 | sol | sol. | disintegr. | disintegr. |

(e-beam dose (Mrad at 4.5 MeV) spans columns 2.5, 5, 10, 20)

N/T = not tested

These results indicate that both the triacrylate and trimethacrylate esters of trimethylolpropane efficiently polymerized under the low doses of e-beam irradiation used, i.e., about 5 Mrad. The plasticized electrolyte formed in E and F does not flow under moderate stress at temperatures above the melting/dissolution point. The fact that such films were insoluble in acetone indicates that the plasticized copolymer is constrained by a three-dimensional network formed by the radiation induced grafting and/or polymerization of the methacrylate esters. The methacrylate ester crosslinking agents should not contain or generate any electrochemically active functional groups that would substantially interfere with the performance of a lithium-ion battery.

The crosslinked copolymeric materials were evaluated in the following manner. As in FIG. 1, the stress-strain relationship was measured at a constant stress rate for an unirradiated sample (curve O in FIG. 1), for samples containing 5% X-linkers E and F from Table 1, above, at exposure doses of 5, 10 and 20 Mrad.

Figure 2:
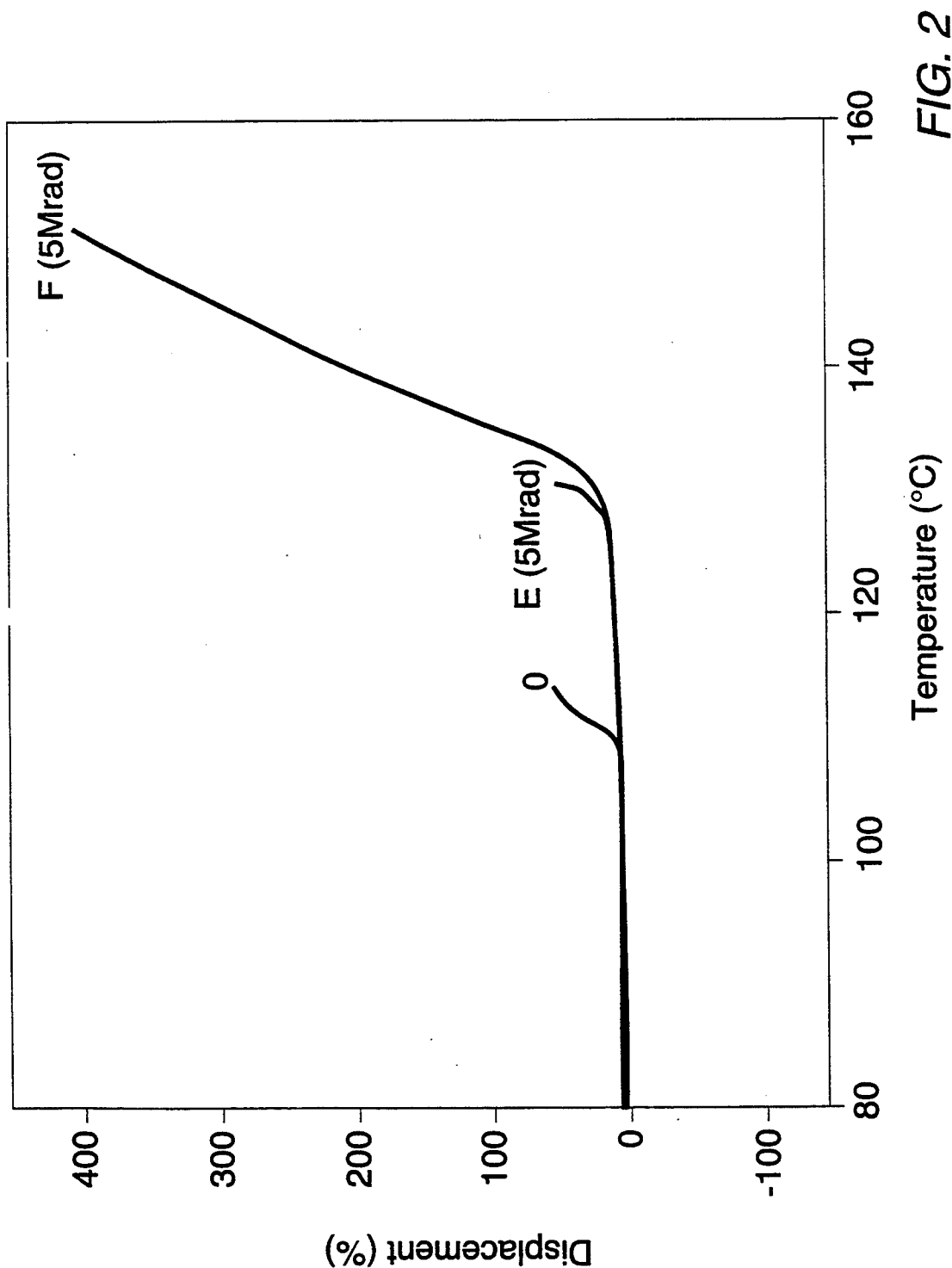
FIG. 2 illustrates the nonisothermal creep resistance for both uncrosslinked and crosslinked samples.
Figure 3:
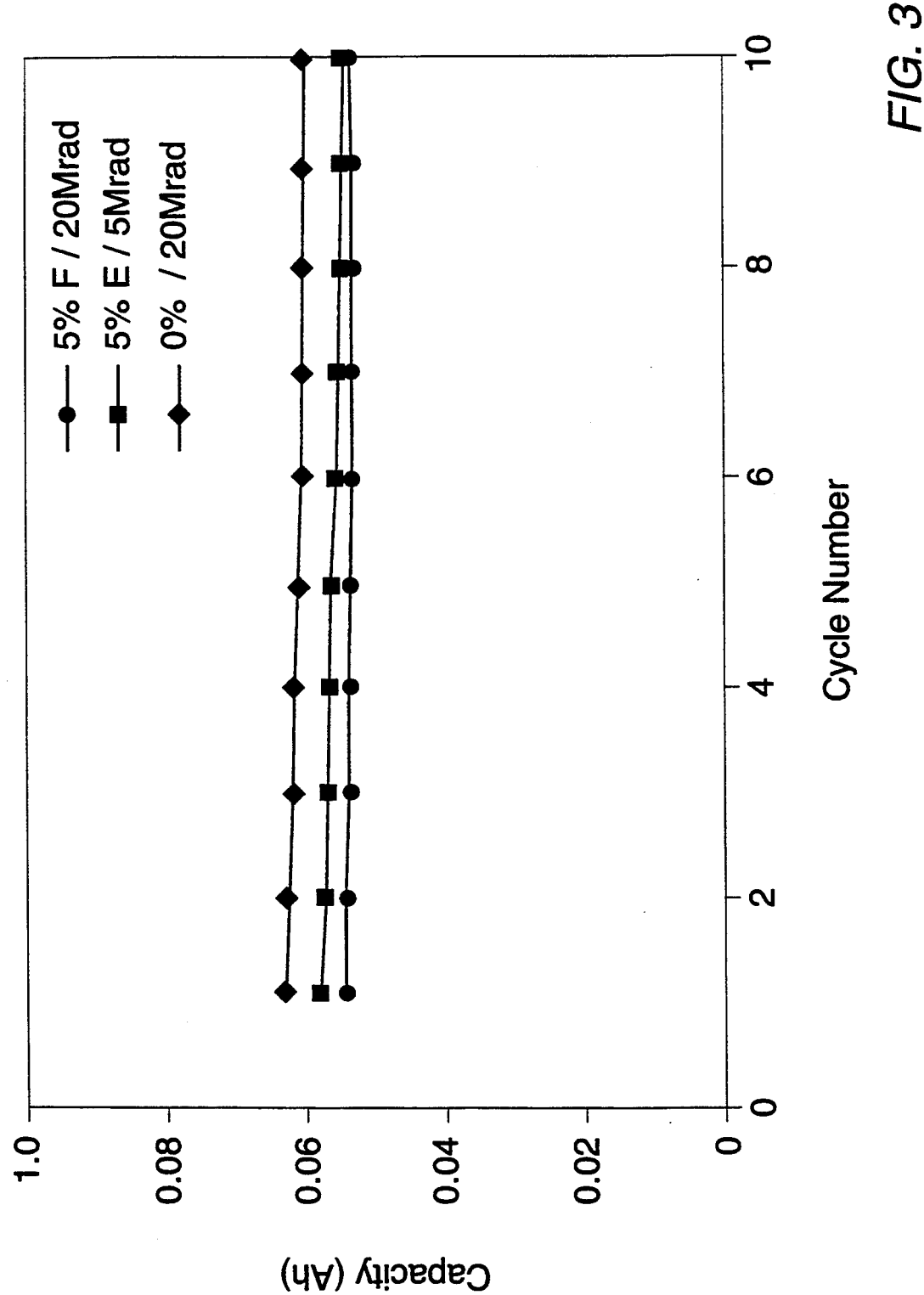
FIG. 3 illustrates the capacity of batteries according to the present invention.

As set forth in FIG. 2, the nonisothermal creep resistance of the crosslinked samples were compared. In FIG. 3, the capacity of a battery incorporating the copolymer of the present invention was not substantially impaired by the presence of crosslinkers E and F at the 5% level vs. DBP, and this performance is expected to improve at lower crosslinker content.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A solid electrolyte for a rechargeable lithium intercalation battery cell comprising a dissociable lithium salt dispersed in a polymeric matrix characterized in that said electrolyte comprises a substantially self-supporting film of a copolymer of vinylidene fluoride and hexafluoropropylene, said copolymer having been crosslinked in the presence of both an extractable plasticizer and a crosslinking agent selected from the group consisting of an acrylate ester, a di- or triallyl ester and a di- or triglycidyl ether, said film having homogeneously distributed therein 20 to 70% by weight of a solution of at least one lithium salt in an organic solvent of said salt.

2. An electrolyte of claim 1, wherein the crosslinking agent is an acrylate ester selected from the group consisting of trimethylolpropane triacrylate, trimethylolpropane trimethacrylate, glycerol triacrylate, and glycerol trimethacrylate.

3. An electrolyte of claim 1, wherein said lithium salt is selected from the group consisting of LIPF$_6$, LiAsF$_6$, LiClO$_4$, LiN(CF$_3$SO$_2$)$_2$, LiBF$_4$, and LiCF$_3$SO$_3$.

4. An electrolyte of claim 1, wherein said solvent is selected from the group consisting of ethylene carbonate, propylene carbonate, dimethylcarbonate, diethoxyethane, diethylcarbonate, dimethoxyethane, dipropyl carbonate, and mixtures thereof.

5. An electrolyte of claim 1, wherein said lithium salt is selected from the group consisting of LIPF$_6$, LiAsF$_6$, LiClO$_4$, LiN(CF$_3$SO$_2$)$_2$, LiBF$_4$, and LiCF$_3$SO$_3$, and said solvent is selected from the group consisting of ethylene carbonate, propylene carbonate, dimethylcarbonate, diethoxyethane, diethylcarbonate, dimethoxyethane, dipropyl carbonate, and mixtures thereof.

6. An electrolyte of claim 1, wherein said copolymer contains greater than 8% by weight hexafluoropropylene.

7. An electrolyte of claim 6, wherein said copolymer contains 8 to 25% by weight hexafluoropropylene.

8. An electrolyte of claim 1, wherein said copolymer contains 10 to 17% by weight hexafluoropropylene.

9. An electrolyte of claim 1, wherein said film comprises 40 to 60% by weight of said lithium salt solution.

10. A rechargeable lithium intercalation battery cell comprising a positive electrode, a negative electrode and an ionically conductive solid electrolyte disposed between said electrodes characterized in that said electrolyte comprises a substantially self-supporting film of a copolymer of vinylidene fluoride and hexafluoropropylene, said copolymer having been crosslinked in the presence of a crosslinking agent selected from the group consisting of an acrylate ester, a di- or triallyl ester and a di- or triglycidyl ether, said film having homogeneously distributed therein 20 to 70% by weight of a solution of at least one lithium salt in a solvent.

11. A battery cell of claim 10, wherein the crosslinking agent is an acrylate ester selected from the group consisting of trimethylolpropane triacrylate, trimethylolpropane trimethacrylate, glycerol triacrylate, and glycerol triacrylate.

12. A battery cell of claim 10, wherein said negative electrode comprises a material selected from the group consisting of lithium, lithium alloys, carbon, $MnO_2$ and $WO_2$.

13. A battery cell of claim 10, wherein said positive electrode comprises a lithium intercalation compound.

14. A battery cell of claim 10, wherein said electrolyte film comprises an individual separator element interposed between said electrodes.

15. A separator membrane for an electrolytic cell characterized in that said membrane comprises a substantially self-supporting film of a copolymer of vinylidene fluoride and hexafluoropropylene, said copolymer has been crosslinked in the presence of both a plasticizer and a crosslinking agent selected from the group consisting of an acrylate ester, a di- or triallyl ester and a di- or triglycidyl ether.

16. A separator membrane of claim 15, wherein the methacrylate ester crosslinking agent is selected from the group consisting of trimethylolpropane triacrylate, trimethylolpropane trimethacrylate, glycerol triacrylate and glycerol trimethacrylate.

17. A rechargeable battery cell assembly comprising a positive electrode, a negative electrode, and a separator membrane disposed therebetween
characterized in that said membrane comprises a substantially self-supporting film of a copolymer of vinylidene fluoride and hexafluoropropylene which has been crosslinked in the presence of a plasticizer and a crosslinking agent selected from the group consisting of an acrylate ester, a di- or triallyl ester and a di- or triglycidyl ether.

18. The battery cell of claim 17, wherein the crosslinking agent is an acrylate ester selected from the group consisting of trimethylolpropane triacrylate, trimethylolpropane trimethacrylate, glycerol triacrylate, and glycerol trimethacrylate.

19. The battery cell of claim 17, wherein said separator membrane contains a crosslinking agent and crosslinking occurs after assembly of the battery cell.

20. The battery cell of claim 19, wherein the electrodes have binder thereon and said binder and said separator membrane contain a crosslinking agent and crosslinking occurs after assembly of the battery cell.

* * * * *